(12) United States Patent
Kuramochi et al.

(10) Patent No.: US 11,747,558 B2
(45) Date of Patent: Sep. 5, 2023

(54) PHOTONIC CRYSTAL OPTICAL RESONATOR

(71) Applicant: Nippon Telegraph and Telephone Corporation, Tokyo (JP)

(72) Inventors: Eiichi Kuramochi, Tokyo (JP); Shota Kita, Tokyo (JP); Hideaki Taniyama, Tokyo (JP); Akihiko Shinya, Tokyo (JP); Masaya Notomi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 238 days.

(21) Appl. No.: 17/431,013

(22) PCT Filed: Feb. 4, 2020

(86) PCT No.: PCT/JP2020/004040
§ 371 (c)(1),
(2) Date: Aug. 13, 2021

(87) PCT Pub. No.: WO2020/170795
PCT Pub. Date: Aug. 27, 2020

(65) Prior Publication Data
US 2022/0075116 A1    Mar. 10, 2022

(30) Foreign Application Priority Data
Feb. 18, 2019   (JP) ................... 2019-026454

(51) Int. Cl.
G02B 6/122    (2006.01)
G02B 6/13     (2006.01)

(52) U.S. Cl.
CPC ............ G02B 6/1225 (2013.01); G02B 6/13 (2013.01)

(58) Field of Classification Search
CPC .................................................. G02B 6/1225
See application file for complete search history.

(56) References Cited

U.S. PATENT DOCUMENTS

2013/0042680 A1* 2/2013 Wong ................... G01V 7/005
73/382 R

FOREIGN PATENT DOCUMENTS

| JP | 2009237095 A | * | 10/2009 |
| JP | 2016115783 A | * | 6/2016 |
| JP | 2018132726 A |   | 8/2018 |

OTHER PUBLICATIONS

Saha et al, "A Slotted Photonic Crystal Nanobeam Cavity for Simultaneous Attainment of Ultra-High Q-Factor and Sensitivity", IEEE Sensors Journal, vol. 18 Issue: 9 (Year: 2018).*

(Continued)

*Primary Examiner* — Charlie Y Peng
(74) *Attorney, Agent, or Firm* — Slater Matsil, LLP

(57) ABSTRACT

First lattice elements shift away from a light confinement portion in a second direction. Second lattice elements shift away from the light confinement portion in the second direction. Third lattice elements shift away from the light confinement portion in the second direction. A shift amount of the first lattice elements is 0.05 to 0.5 times as large as a crystal period. A shift amount of the second lattice elements is 0.02 to 0.5 times as large as the crystal period. A shift amount of the third lattice elements is 0.01 to 0.5 times as large as the crystal period.

12 Claims, 2 Drawing Sheets

(56) References Cited

OTHER PUBLICATIONS

Kuramochi, E. et al., "Ultrahigh-Q/V Single Point-Defect Photonic Crystal Nanocavity with Embedded Sub-Wavelength Air-Slot," Conference on Lasers and Electro-Optics OSA Technical Digest, May 14, 2017, 2 pages.

Minkov, M. et al., "Automated Optimization of Photonic Crystal Slab Cavities," Scientific Reports, vol. 4, No. 5124, May 30, 2014, 8 pages.

Sugihara, O. et al., "Electrooptic Polymers and Optical Waveguide Device Applications," Japan Society of Applied Physics Optics, vol. 38, No. 12, Aug. 1, 2009, 13 pages.

* cited by examiner

PHOTONIC CRYSTAL OPTICAL RESONATOR

This patent application is a national phase filing under section 371 of PCT/JP2020/004040, filed Feb. 4, 2020, which claims the priority of Japanese patent application no. 2019-026454, filed Feb. 18, 2019, each of which is incorporated herein by reference in its entirety.

TECHNICAL FIELD

The present disclosure relates to a photonic crystal optical resonator.

BACKGROUND ART

A photonic crystal is a man-made material having a periodic crystal structure made of two or more types of media having different refractive indices, and has functions of controlling propagation, refraction, and reflection of light, and capturing of light. There is a strong expectation that a photonic crystal formed to have a submicron crystal period achieves drastic miniaturization of an optical integrated circuit including an optical waveguide of the related art for light having varying wavelengths, microminiaturization of an optical device, and a reduction in energy consumption.

Photonic crystal optical resonators manufactured in various designs have been proposed and developed until now. Hereinafter, attention is focused on single point defective optical resonators. The photonic crystal may have a periodic crystal structure including a base and lattice elements as through holes formed in the base. For example, a photonic crystal (two-dimensional photonic crystal) may have a periodic crystal structure in which lattice elements are arranged in a two-dimensional triangular lattice. In this photonic crystal, a resonator may be configured by a light confinement structure formed by a defect in which a lattice element is removed from a lattice point. A location of the lattice point in which the lattice element is removed is referred to as a point defect. A resonator configured by the light confinement structure formed by one point defect has 6-fold rotational symmetry of crystal in plan view about the light confinement structure and is referred to as an H1 resonator.

The H1 resonator is a type in which an actual resonator size (footprint) and an optical volume (mode volume: V) are the smallest among the photonic crystal optical resonators. However, when a slot structure to be described below is not disposed, a design in which the mode volume V of the H1 resonator is less than $1(\lambda/2n)^3$ has not been reported until now. The slot structure is a structure in which, for example, a cuboid embedded structural body called a slot is embedded in a base of the light confinement structure. The slot in the slot structure typically has a width of less than 200 nm, and this slot has effects of strongly confining an electric field of light within a small sub-wavelength slot and strongly enhancing strength. Properties of such a slot structure are considered to be extremely useful in applications such as the capture of atoms and molecules, the detection and capture of molecules and DNA in biosensors, the achievement of high-performance optical devices by filling of an active medium, and the like.

In view of the foregoing properties, in the technology disclosed in Patent Literature 1, a slot having a short length and a very narrow width that fits within the point defect of the H1 resonator is disposed in the light confinement structure. This configuration enables the design in which the mode volume V of the H1 resonator is drastically less than $1(\lambda/2n)^3$ while a single point defect resonator is maintained. In the technology of Patent Literature 1, the lattice elements on an extension line of the slot in a longitudinal direction shift from lattice points outward of the slot, and thus, a Q value may drastically increase. Actually, the aforementioned technology makes it possible to experimentally obtain an optical resonator having a Q value of 200,000 and Q/V of 10 million (see Non Patent Literature 1).

CITATION LIST

Patent Literature

Patent Literature 1: JP 2018-132726

Non Patent Literature

Non Patent Literature 1: E. Kuramochi, J. K. Kim, H. Taniyama, A. Shinya, S. Kita, and M. Notomi, "Ultrahigh-Q/V Single Point-defect Photonic Crystal Nanocavity with Embedded Sub-wavelength Air-slot", Conference on Lasers and Electro-Optics OSA Technical Digest (online) (Optical Society of America, 2017), paper JTh3M.5. https://doi.org/10.1364/CLEO_AT.2017.

Non Patent Literature 2: Sugihara Okihiro et al., "Electrooptic Polymers and Optical Waveguide Device Applications", Applied Physical Society, optical, volume 38, Issue 12, pp. 598-603, 2009.

SUMMARY

Technical Problem

Patent Literature 1 described above describes the design technology in which light is concentrated on an antinode of one electric field in the slot having sub-wavelength dimensions, the mode volume V of the H1 resonator is greatly less than $1(\lambda/2n)^3$, and the Q value is greater than 100,000. The small slot that does not essentially destroy the H1 resonator is disposed and combined in the H1 resonator, and such a point is the maximum point of the technology of Patent Literature 1. Patent Literature 1 describes the technology in which the plurality of lattice elements on the extension line of the slot in the longitudinal direction shifts in an outward direction to increase the Q value to a practically useful value. However, there is a large number of lattice elements around the resonator in addition to the lattice elements shifting from the lattice points according to the aforementioned technology, but it has not been apparent until now whether a resonator having a high Q value and a small V is achieved by shifting these other lattice elements.

In the technology of Patent Literature 1, even when a refractive index of a low-refractive-index medium constituting the slot of the photonic crystal and cladding layers formed above and below a photonic crystal body is greater than one (vacuum/air), a resonator having very high Q value and Q/V may be achieved. However, in this technology, when the refractive index of the low-refractive-index medium is greater than a refractive index of air, there is a problem that the mode volume V increases. For example, the mode volume V of the H1 resonator when the low-refractive-index medium is water (having a refractive index of 1.3) is approximately $0.06(\lambda/n)^3$. The mode volume V of the H1 resonator when the low-refractive-index medium is a silicon oxide film (having a refractive index of 1.45) has a slightly greater value of approximately $0.1(\lambda/n)^3$. In Patent Literature 1, a particular lattice element shifts for increasing the Q value, and thus, an increase in the mode volume V of the H1 resonator is not taken into consideration.

Embodiments of the present disclosure can solve the aforementioned problems, and an embodiment of the present disclosure further reduces a mode volume of a resonator even when a refractive index of a low-refractive-index medium of a photonic crystal is greater than a refractive index of air.

Means for Solving the Problem

Embodiments of the present disclosure provide a photonic crystal optical resonator including a plate-like photonic crystal body including a base and a plurality of columnar lattice elements having a refractive index different from a refractive index of the base, the plurality of lattice elements being periodically provided on the base in a lattice shape at an interval equal to or less than a wavelength of target light, a light confinement portion formed by a defect formed by a portion in which no lattice element is present at a lattice point of the photonic crystal body, and an embedded structural body a longitudinal direction of which extends in a first direction along a Γ-K crystal orientation of a photonic crystal formed by the lattice elements, the embedded structural body being embedded in the base of the light confinement portion and having a refractive index less than the refractive index of the base. One of the resonant modes of the resonator formed by the light confinement portion is in a state of having only one electric-field antinode in the embedded structural body, the embedded structural body has a refractive index greater than a refractive index of air, first lattice elements adjacent to the light confinement portion in a second direction perpendicular to the first direction on a plane in which the plurality of lattice elements are arranged shift from lattice points to separate from the light confinement portion in the second direction, second lattice elements adjacent to the first lattice elements in the first direction shift from lattice points to separate from the light confinement portion in the second direction, third lattice elements adjacent to the first lattice elements and the second lattice elements on a side separating from the light confinement portion in the second direction shift from lattice points to separate from the light confinement portion in the second direction, a shift amount of the first lattice elements is 0.05 to 0.5 times as large as a crystal period, a shift amount of the second lattice elements is 0.02 to 0.5 times as large as the crystal period, and a shift amount of the third lattice elements is 0.01 to 0.5 times as large as the crystal period.

In a configuration example of the photonic crystal optical resonator, fourth lattice elements adjacent to the light confinement portion in the first direction shift to separate from the light confinement portion in the first direction.

In a configuration example of the photonic crystal optical resonator, the first lattice elements, the second lattice elements, and the third lattice elements shift in the first direction.

In a configuration example of the photonic crystal optical resonator, the shift amount is optimized according to a difference in refractive index between the base and each lattice element such that a Q value of the resonator is maximized.

In a configuration example of the photonic crystal optical resonator, the light confinement portion is formed by a point defect in which one of the plurality of lattice elements of the photonic crystal is removed.

In a configuration example of the photonic crystal optical resonator, a length of the embedded structural body in the first direction is 0.65 to 1.25 times as large as the crystal period.

Effects of Embodiments of the Invention

As described above, embodiments of the present disclosure may further reduce the mode volume of the resonator even when the refractive index of the low-refractive-index medium of the photonic crystal is greater than the refractive index of air.

DETAILED DESCRIPTION OF ILLUSTRATIVE EMBODIMENTS

Figure 1:
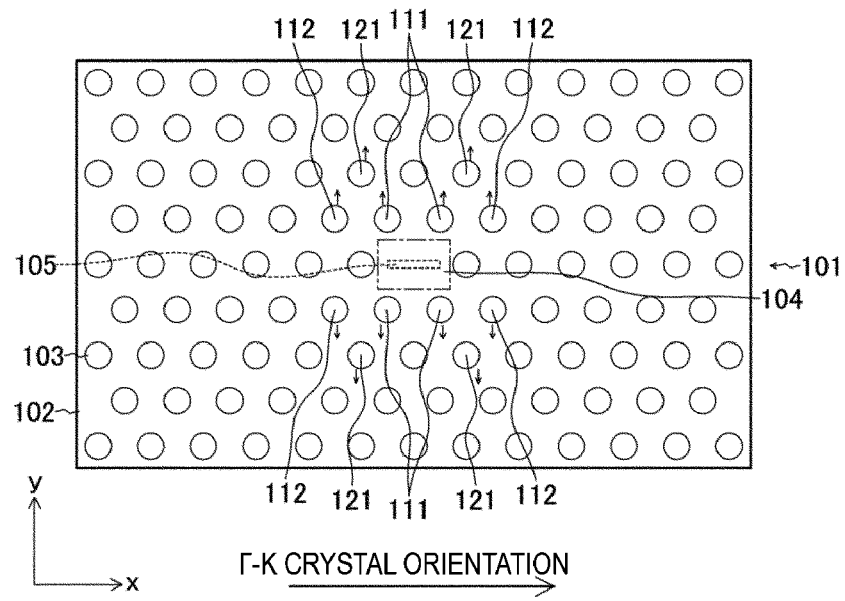
FIG. 1 is a plan view illustrating a configuration of a photonic crystal optical resonator according to an embodiment of the present disclosure.
Figure 2:
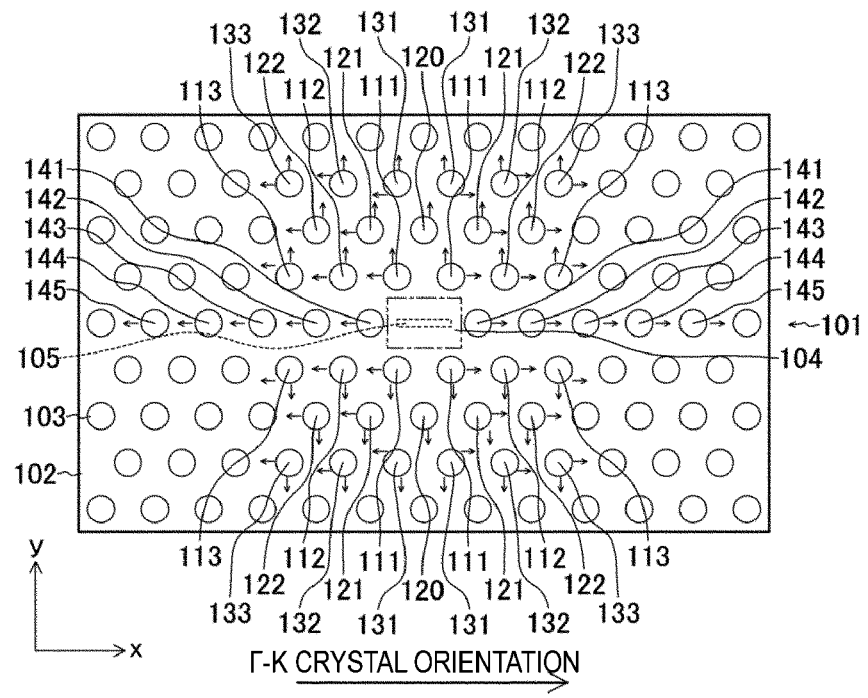
FIG. 2 is a plan view illustrating a more detailed configuration of the photonic crystal optical resonator according to the embodiment of the present disclosure.

Hereinafter, a photonic crystal optical resonator according to an embodiment of the present disclosure will be described with reference to FIG. 1.

The photonic crystal optical resonator first includes a base 102 and a plurality of columnar lattice elements 103 having a refractive index different from a refractive index of the base 102. The photonic crystal optical resonator includes a plate-like photonic crystal body 101 in which the plurality of lattice elements 103 is periodically provided on the base 102 in a lattice shape at an interval equal to or less than a wavelength of target light. The photonic crystal body 101 is a so-called two-dimensional slab type photonic crystal. The lattice elements 103 are, for example, columnar structures. Similar to an embedded structural body 105 to be described below, the refractive index of each lattice element 103 is less than the refractive index of the base 102 and is greater than a refractive index of air.

The photonic crystal optical resonator includes a light confinement portion 104 that is provided on the photonic crystal body 101 and is formed by a defect in a portion in which the lattice element 103 is not present at a lattice point of a photonic crystal. The light confinement portion 104 is formed by, for example, a point defect in which one lattice element 103 of the photonic crystal is removed.

The photonic crystal optical resonator also includes the embedded structural body 105 in the base 102 in the light confinement portion 104. A longitudinal direction of the embedded structural body 105 extends in a first direction (x-direction) along a Γ-K crystal orientation of the photonic crystal formed by the lattice elements 103. The embedded structural body 105 is also embedded in the base 102. The embedded structural body 105 is disposed in a center of the light confinement portion 104 in plan view.

The refractive index of the embedded structural body 105 is less than the refractive index of the base 102 and is greater than the refractive index of air. For example, the embedded structural body 105 is formed from water. A base resonant mode of a resonator due to the light confinement portion 104 is in a state of having only one electric-field antinode within the embedded structural body 105. For example, a length of the embedded structural body 105 in the first direction is 0.65 to 1.25 times as large as a crystal period. For example, a length of the embedded structural body 105 in a second direction (y-direction) perpendicular to the first direction in plan view is 1/20 to 1/8 times as large as the crystal period.

The longitudinal direction of the embedded structural body 105 is a horizontal direction of the paper in FIG. 1, but the embedded structural body has an equivalent structure even when the longitudinal direction is rotated by ±60 degrees from the state illustrated in FIG. 1 due to 6-fold rotational symmetry of the photonic crystal.

In the photonic crystal optical resonator, first lattice elements 111 adjacent to the light confinement portion 104 shift from lattice points to separate from the light confinement portion 104 in the second direction (y-direction) perpendicular to the first direction on a plane in which the lattice elements 103 are arranged. The shift amount of the first lattice elements 111 is 0.05 to 0.5 times as large as the crystal period.

Second lattice elements 112 adjacent to the first lattice elements 111 in the first direction shift from lattice points to separate from the light confinement portion 104 in the second direction. The shift amount of the second lattice elements 112 is 0.02 to 0.5 times as large as the crystal period.

Third lattice elements 121 adjacent to the first lattice elements 111 and the second lattice elements 112 on a side separating from the light confinement portion 104 in the second direction shift from lattice points to separate from the light confinement portion 104 in the second direction. The shift amount of the third lattice elements 121 is 0.01 to 0.5 times as large as the crystal period.

Hereinafter, the photonic crystal optical resonator according to the embodiment will be described in more detail. A resonant wavelength or the like sensitively changes with a subtle refractive index change in the embedded structural body 105, and thus, this photonic crystal optical resonator may be used as a refractive index sensor. The microscale to sub-microscale embedded structural body 105 may be applied as a sensor used to detect micro objects or organism-related polymers such as DNA. When an optical resonator device is manufactured in which the embedded structural body 105 is filled with a low-refractive-index medium having functionality such as a light nonlinear effect or optical amplification and the embedded structural body serves as an active layer, it is possible to achieve, in particular, a device that operates with very low energy and a device that operates with extremely high energy efficiency in principle due to enhanced light-matter interactions due to high Q/V.

Hereinafter, it is assumed that the base 102 is made of silicon (having a refractive index of 3.46) and the refractive indices of each lattice element 103 and the embedded structural body 105 are 1.31. Although not illustrated, it is assumed that cladding layers having a refractive index of 1.31 are formed on a top surface side and a back surface side of the base 102. This refractive index 1.31 corresponds to a refractive index of water or heavy water in a wavelength band of 1.3 to 1.6 μm used in optical communication.

The lattice element 103 is a columnar through hole and a radius of this hole is 96 nm. The base 102 has a thickness of 220 nm. A period a of the photonic crystal is 420 nm. Dimensions of the embedded structural body 105 on the plane in which the lattice elements 103 are arranged are 410 nm in the first direction and 40 nm in the second direction.

Hereinafter, fourth lattice elements 141, fifth lattice elements 113, sixth lattice elements 120, seventh lattice elements 122, eighth lattice elements 131, ninth lattice elements 132, tenth lattice elements 133, eleventh lattice elements 142, twelfth lattice elements 143, thirteenth lattice elements 144, and fourteenth lattice elements 145 are also shifting targets in addition to the first lattice elements 111, the second lattice elements 112, and the third lattice elements 121. The elements also shift from the lattice points in the first direction in addition to the second direction. The shift amount of each lattice element 103 is optimized according to a difference in refractive index between the base 102 and the lattice element 103 such that a Q value of the resonator is maximized.

In Patent Literature 1, the lattice elements that are adjacent to the light confinement portion 104 but do not shift from the lattice points are provided. In contrast, in embodiments of the present disclosure, there are no such limitations, and the adjustment of the shifts of all the lattice elements in the vicinity of the light confinement portion 104 for controlling a Q value and a mode volume V has been studied. In this study, it is found that useful resonator performance is obtained by adjusting the shift amount of each lattice element shown in the following Tables 1 to 3 by electromagnetic field analysis.

In the tables, a is a lattice constant of the photonic crystal. In the tables, the shift amount in a direction away from the light confinement portion 104 (embedded structural body 105), which is the center of the resonator, is positive. Accordingly, the shift amount in a direction approaching the light confinement portion 104 is negative. Moreover, "x" indicates the shift amount in the first direction (x-direction), and "y" indicates the shift amount in the second direction (y-direction).

TABLE 1

| FIRST LATTICE ELEMENT | x 0.11684a | EIGHTH LATTICE ELEMENT | x −0.04a |
|---|---|---|---|
| | y 0.35281a | | y −0.06174a |
| SECOND LATTICE ELEMENT | x 0.13671a | NINTH LATTICE ELEMENT | x 0.03585a |
| | y 0.17295a | | y −0.08a |
| | | TENTH LATTICE ELEMENT | x 0.03775a |
| FIFTH LATTICE ELEMENT | x 0.05235a | | y −0.02792a |
| | y 0.06613a | FOURTH LATTICE ELEMENT | x −0.04a |
| SIXTH LATTICE ELEMENT | x 0 | | x 0 |
| | y 0.12a | ELEVENTH LATTICE ELEMENT | x −0.08a |
| THIRD LATTICE ELEMENT | x 0.01134a | | 0 |
| | y 0.1269a | TWELFTH LATTICE ELEMENT | x −0.06677a |
| SEVENTH LATTICE ELEMENT | x 0.07002a | | 0 |
| | y 0.03013a | THIRTEENTH LATTICE ELEMENT | x −0.01692a |
| | | | 0 |
| | | FOURTEENTH LATTICE ELEMENT | x 0.02184a |

In the resonant mode of the photonic crystal optical resonator adjusted by the shifts shown in Table 1, a Q value of 2 million and a mode volume V of $0.028(\lambda/n)^3$ are shown at a resonant mode wavelength of 1,578 nm by electromagnetic field analysis. This resonant mode has properties substantially equivalent to the resonant mode of the embedded structural body in Patent Literature 1 in that only one electric-field antinode occupying the interior of the embedded structural body 105 has a particularly strong electric field strength. However, in embodiments of the present disclosure, light confinement is more intense and the mode volume V is equal to or less than half.

In Patent Literature 1, the eleventh lattice elements 142 to the fourteenth lattice elements 145 largely shift in a direction toward the outside of the resonator. For example, the eleventh lattice elements 142 shift by more than 0.1a. In contrast, in the shifts illustrated in Table 1, the eleventh lattice elements 142 to the thirteenth lattice elements 144 shift in an opposite direction, that is, a direction toward the inside of the resonator. Meanwhile, the other lattice elements that do not shift in Patent Literature 1 largely shift. Thus, Patent Literature 1 and embodiments of the present disclosure are fundamentally different.

In each shift amount shown in Table 1, the shifts of the first lattice elements 111 and the second lattice elements 112 adjacent to the embedded structural body 105 particularly have a significant influence on the performances such as the Q value and the mode volume V. For example, when the shift amounts of the first lattice elements 111 and the second lattice elements 112 are zero, it is difficult to obtain a useful Q value and mode volume V except for the design of Patent Literature 1. For the third lattice elements 121, when the shift in the second direction (y-direction) is zero or an inward direction (negative value), a reduction in the Q value is too large to ignore, compared with a case where the third lattice elements shift outward. As also shown in the following Tables 2 and 3, when the low-refractive-index portions (cladding layers) above and below the base 102, except for the high-refractive-index base 102, are not air, but water (having a refractive index of 1.3) or a higher-refractive-index medium, the shift amounts of the first lattice elements 111, the second lattice elements 112, and the third lattice elements 121 tend to have large positive values (in the outward direction).

Figure 3:
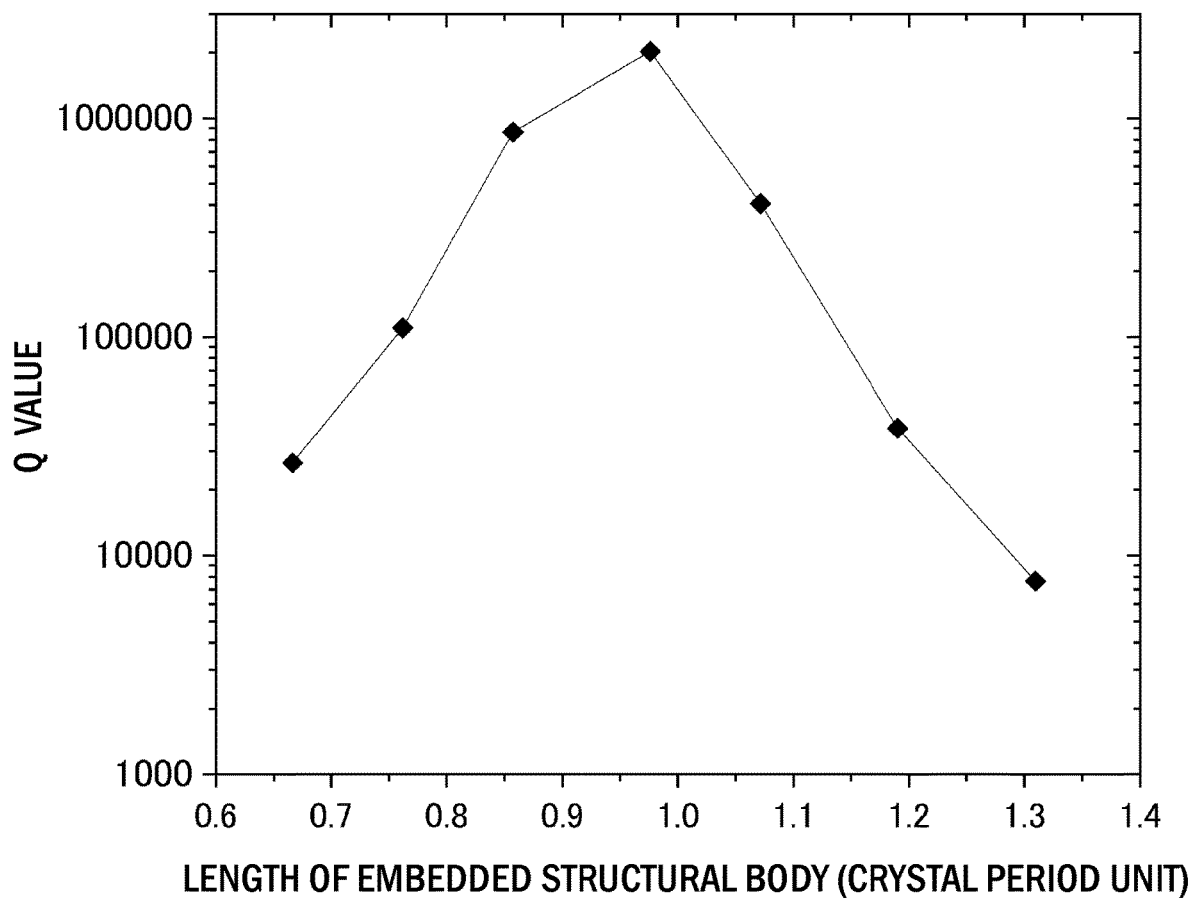
FIG. 3 is a characteristic diagram illustrating results obtained by calculating a relationship between a length (crystal period unit) and a Q value of an embedded structural body of the photonic crystal optical resonator having each shift amount shown in Table 1.

FIG. 3 illustrates results obtained by calculating a relationship between the Q value and the length (crystal period unit) of the embedded structural body 105 of the photonic crystal optical resonator having each shift amount shown in Table 1. As illustrated in FIG. 3, it may be found that a Q value of approximately more than 10,000 is obtained by making the length of the embedded structural body 105 in the first direction 0.65 to 1.25 times as large as the crystal period.

Next, Table 2 will be described. In Table 2, the base 102 is made of silicon (having a refractive index of 3.46) and the refractive indices of each lattice element 103 and the embedded structural body 105 are 1.45. Although not illustrated, cladding layers having a refractive index of 1.45 are formed on the top surface side and the back surface side of the base 102. This refractive index of 1.45 corresponds to a refractive index of silicon oxide ($SiO_2$) in the wavelength band of 1.3 to 1.6 μm used in optical communication. A configuration made of silicon and silicon oxide is a representative material configuration in well-known silicon photonics. This is said to be important to introduce the photonic crystal optical resonator having high Q/V into silicon photonics by adjusting the shift amount of each lattice element shown in Table 2.

In Table 2, the lattice element 103 is a columnar through hole and a radius of this hole is 99 nm. The base 102 has a thickness of 220 nm. A period a of the photonic crystal is 415 nm. Dimensions of the embedded structural body 105 on the plane in which the lattice elements 103 are arranged are 390 nm in the first direction and 40 nm in the second direction.

TABLE 2-continued

| ELEMENT | | | TENTH LATTICE | x | 0.01321a |
|---|---|---|---|---|---|
| FIFTH LATTICE | x | 0.09336a | ELEMENT | y | 0.03628a |
| ELEMENT | y | 0.04113a | FOURTH LATTICE | x | −0.1348a |
| SIXTH LATTICE | x | 0 | ELEMENT | | |
| ELEMENT | y | 0.08226a | ELEVENTH LATTICE | x | −0.1348a |
| THIRD LATTICE | x | −0.03934a | ELEMENT | | |
| ELEMENT | y | 0.01327a | TWELFTH LATTICE | x | −0.05539a |
| SEVENTH | x | 0.07424a | ELEMENT | | |
| LATTICE | y | 0.02393a | THIRTEENTH | x | −0.04147a |
| ELEMENT | | | LATTICE ELEMENT | | |
| | | | FOURTEENTH | x | 0.02236a |
| | | | LATTICE ELEMENT | | |

In the resonant mode of the photonic crystal optical resonator adjusted by the shifts shown in Table 2, a Q value of 1.8 million and a mode volume V of $0.032(\lambda/n)^3$ are shown at a resonant mode wavelength of 1,578 nm by electromagnetic field analysis. This resonant mode has properties substantially equivalent to the photonic crystal optical resonator adjusted by the shifts represented in Table 1 in that only one electric-field antinode occupying the interior of the embedded structural body 105 has a particularly strong electric field strength.

It is noted that the mode volume V is suppressed at an extremely small value even though the refractive indices of the vicinity of the base 102 such as the cladding layers, the lattice elements 103, and the low-refractive-index medium ($SiO_2$) filling the embedded structural body 105 further increase. A theoretical Q/V value of the photonic crystal optical resonator adjusted by the shifts shown in Table 2 is more than 50 million. As stated above, the high performance that is difficult to be achieved with the photonic crystal optical resonator of the related art is achievable by embodiments of the present disclosure.

In the photonic crystal optical resonator adjusted by the shifts shown in Table 2, the shift amount of the first lattice elements 111 in the y-direction and the shift amount of the second lattice elements 112 in the y-direction are extremely large. It is important that the shift amount of the second lattice elements 112 in the y-direction is a positive value that is not small (in the outward direction).

Next, Table 3 will be described. In Table 3, the base 102 is made of silicon (having a refractive index of 3.46) and the refractive indices of each lattice element 103 and the embedded structural body 105 are 1.70. Although not illustrated, cladding layers having a refractive index of 1.70 are formed on the top surface side and the back surface side of the base 102. This refractive index 1.70 corresponds to the refractive indices of various electro-optical polymer materials in the wavelength band of 1.3 to 1.6 μm used in the optical communication. This is said to be important to achieve the photonic crystal optical resonator using the electro-optical polymer as an active medium by adjusting the shift amount of each lattice element shown in Table 3.

In Table 3, the lattice element 103 is a columnar through hole and a radius of this hole is 92 nm. The base 102 has a thickness of 220 nm. A period a of the photonic crystal is 390 nm. Dimensions of the embedded structural body 105 on the plane in which the lattice elements 103 are arranged are 390 nm in the first direction and 40 nm in the second direction.

TABLE 2

| FIRST LATTICE | x | 0.16325a | EIGHTH LATTICE | x | −0.03358a |
|---|---|---|---|---|---|
| ELEMENT | y | 0.21010a | ELEMENT | y | −0.06885a |
| SECOND | x | 0.14784a | NINTH LATTICE | x | −0.01516a |
| LATTICE | y | 0.16780a | ELEMENT | y | −0.04530a |

TABLE 3

| FIRST LATTICE | x | 0.08530a | EIGHTH LATTICE | x | −0.01479a |
|---|---|---|---|---|---|
| ELEMENT | y | 0.3513a | ELEMENT | y | 0.12982a |
| SECOND | x | 0.11293a | NINTH LATTICE | x | 0.04383a |
| LATTICE | y | 0.18059a | ELEMENT | y | 0.02719a |

TABLE 3-continued

| ELEMENT | | | ELEMENT | | |
|---|---|---|---|---|---|
| FIFTH LATTICE ELEMENT | x | 0.07495a | TENTH LATTICE ELEMENT | x | 0.05576a |
| | y | 0.05267a | | y | 0.00970a |
| SIXTH LATTICE ELEMENT | x | 0 | FOURTH LATTICE ELEMENT | x | 0.02666a |
| | y | 0.15511a | ELEVENTH LATTICE ELEMENT | x | −0.1016a |
| THIRD LATTICE ELEMENT | x | −0.00446a | | | |
| | y | 0.15604a | TWELFTH LATTICE ELEMENT | x | −0.06426a |
| SEVENTH LATTICE ELEMENT | x | 0.05163a | | x | −0.0359a |
| | y | 0.04011a | THIRTEENTH LATTICE ELEMENT | x | 0.04366a |
| | | | FOURTEENTH LATTIC ELEMENT | | |

In the resonant mode of the photonic crystal optical resonator adjusted by the shifts shown in Table 3, a Q value of 800,000 and a mode volume V of $0.063(\lambda/n)^3$ are shown at a resonant mode wavelength of 1,565 nm by electromagnetic field analysis. This resonant mode has properties substantially equivalent to the photonic crystal optical resonator adjusted by the shifts represented in Table 1 in that only one electric-field antinode occupying the interior of the embedded structural body 105 has a particularly strong electric field strength. The mode volume V is as extremely small as approximately half of $(\lambda/2n)^3$ and the theoretical Q/V value is more than 10 million even though the refractive index of the low-refractive-index medium (electro-optical polymer) is very high. As stated above, the high performance that is difficult to be achieved with photonic crystal optical resonators of the related art is achievable by embodiments of the present disclosure.

In the photonic crystal optical resonator adjusted by the shifts shown in Table 3, the shift amount of the first lattice elements 111 in the y-direction, the shift amount of the second lattice elements 112 in the y-direction, and the shift amount of the third lattice elements 121 in the y-direction are extremely large. These shifts play an important role in increasing the Q value of the photonic crystal optical resonator.

As described above, according to embodiments of the present disclosure, the first lattice elements shift to separate from the light confinement portion in the second direction, the second lattice elements shift to separate from the light confinement portion in the second direction, and the third lattice elements shift to separate from the light confinement portion in the second direction. Thus, the mode volume of the resonator may be reduced even when the refractive index of the low-refractive-index medium of the photonic crystal is greater than a refractive index of air.

According to embodiments of the present disclosure, the longitudinal direction of the embedded structural body extends in the direction of the Γ-K crystal orientation of the photonic crystal by the lattice elements, the embedded structural body is provided in the base of the light confinement portion, and the two-dimensional photonic crystal optical resonator capable of achieving both the high Q value and concentration of electric fields on a single antinode is combined with an outward shift of a particular lattice element different from the particular lattice element of Patent Literature 1. Accordingly, a higher light confinement effect is obtained.

The embedded structural body is embedded within a single point defect, and thus, the photonic crystal optical resonator according to embodiments of the present disclosure is a type of single point defect (H1) optical resonator. A very high Q value and a small mode volume are achieved as the H1 resonator, and when the low-refractive-index medium constituting the photonic crystal is any matter other than vacuum and air, the photonic crystal optical resonator of embodiments of the present disclosure has particularly effective features. Embodiments of the present disclosure present that the shifts in a direction toward the outside of the resonator of the first lattice elements, the second lattice elements, and the third lattice elements in the second direction perpendicular to the Γ-K crystal orientation play an important role.

In Tables 1 to 3, the adjustment is also performed such that the positions of a total of 44 lattice elements of the fourth lattice elements, fifth lattice elements, sixth lattice elements, seventh lattice elements, eighth lattice elements, ninth lattice elements, tenth lattice elements, eleventh lattice elements, twelfth lattice elements, thirteenth lattice elements, and fourteenth lattice elements shift in the first direction and the second direction. The shifts of these lattice elements are effective in increasing the Q value of the photonic crystal optical resonator and suppressing the mode volume V, and thus, it is desirable that these lattice elements indispensably y shift in an appropriate manner.

However, the optimum shift amount of each lattice element of the aforementioned photonic crystal optical resonator varies greatly depending on the dimensions of the embedded structural body and the lattice element as well as the refractive indices of the material and the medium. Most of the shifts of the 44 lattice elements vary greatly as the refractive index and the dimensions vary, and the shift amount may be extremely large or may be substantially zero. Furthermore, an orientation of the shift may be toward the inside or outside with respect to the center of the resonator.

The shift to be given greatly depends on the dimensions and refractive index of each portion of the photonic crystal, and thus, it is difficult to obtain empirical knowledge. Meanwhile, in embodiments of the present disclosure, a useful effect is constantly obtained for the shifts of the first lattice elements, the second lattice elements, and the third lattice elements regardless of the dimensions and refractive index of each portion of the photonic crystal. Meanwhile, when the shift amounts of the first lattice elements, the second lattice elements, and the third lattice elements are not those described in embodiments of the present disclosure, the performance of the optical resonator is greatly impaired.

In embodiments of the present disclosure, in a case where the low-refractive-index medium constituting the photonic crystal such as the lattice elements or the embedded structural body is vacuum or air (having a refractive index of 1), when the shift amount of each of the first lattice elements, the second lattice elements, and the third lattice elements is outside the range indicated in the aforementioned embodiments, better resonator performance may be obtained.

In each of the shift amounts shown in Tables 1 to 3, the medium of the embedded structural body is identical to each lattice element or the cladding layers disposed above and below the photonic crystal. However, the resonant mode having the aforementioned features of embodiments of the present disclosure may be achieved even when the medium of the embedded structural body is replaced with a functional active medium different from the cladding layer or the lattice element to enhance the performance of the particular device.

The present disclosure is not limited to the embodiments described above, and it is obvious that many modifications and combinations can be implemented by a person having ordinary knowledge in the field within the technical spirit of the present disclosure.

For example, the base of the photonic crystal body may be made of Ge, GaAs, InP, GaP, GaN, AlN, SiC, diamond, SiN, or the like, which have a refractive index of two or more. The embedded structural body and each lattice element may also be formed from air and vacuum. The embedded structural body and the lattice element may be made of a low-refractive-index medium having a refractive index of 1.8 or less.

REFERENCE SIGNS LIST

101 Photonic crystal body
102 Base
103 Lattice element
104 Light confinement portion
105 Embedded structural body
111 First lattice element
112 Second lattice element
121 Third lattice element

The invention claimed is:

1. A photonic crystal optical resonator comprising:
a plate-like photonic crystal body including a base and a plurality of columnar lattice elements having a refractive index different from a refractive index of the base, the plurality of lattice elements being spaced apart on the base in a lattice shape at an interval equal to or less than a wavelength of target light;
a light confinement portion comprising a defect provided by a portion in which no lattice element is present at a lattice point of the photonic crystal body; and
an embedded structural body having a longitudinal direction which extends in a first direction along a Γ-K crystal orientation of a photonic crystal formed by the lattice elements, the embedded structural body being embedded in the base in the light confinement portion and having a refractive index less than the refractive index of the base;
wherein one of resonant modes of the resonator formed by the light confinement portion is in a state of having only one electric-field antinode in the embedded structural body;
wherein the embedded structural body has a refractive index greater than a refractive index of air;
wherein first lattice elements of the plurality of lattice elements adjacent to the light confinement portion in a second direction perpendicular to the first direction on a plane in which the plurality of lattice elements are arranged are configured to shift from first lattice points to separate from the light confinement portion in the second direction;
wherein second lattice elements of the plurality of lattice elements adjacent to the first lattice elements in the first direction are configured to shift from second lattice points to separate from the light confinement portion in the second direction;
wherein third lattice elements of the plurality of lattice elements adjacent to the first lattice elements and the second lattice elements on a side separating from the light confinement portion in the second direction are configured to shift from third lattice points to separate from the light confinement portion in the second direction;
wherein a shift amount of the first lattice elements is 0.05 to 0.5 times as large as a crystal period;
wherein a shift amount of the second lattice elements is 0.02 to 0.5 times as large as the crystal period; and
wherein a shift amount of the third lattice elements is 0.01 to 0.5 times as large as the crystal period.

2. The photonic crystal optical resonator according to claim 1, wherein fourth lattice elements of the plurality of lattice elements adjacent to the light confinement portion in the first direction are configured to shift to separate from the light confinement portion in the first direction.

3. The photonic crystal optical resonator according to claim 1, wherein the first lattice elements, the second lattice elements, and the third lattice elements are configured to shift in the first direction.

4. The photonic crystal optical resonator according to claim 3, wherein the shift amounts are optimized according to a difference in refractive index between the base and each lattice element such that a Q value of the resonator is maximized.

5. The photonic crystal optical resonator according to claim 1, wherein the light confinement portion comprises a point defect in which one of the plurality of lattice elements of the photonic crystal is removed.

6. The photonic crystal optical resonator according to claim 1, wherein a length of the embedded structural body in the first direction is 0.65 to 1.25 times as large as the crystal period.

7. A method of forming a photonic crystal optical resonator, the method comprising:
providing a plate-like photonic crystal body including a base and a plurality of columnar lattice elements having a refractive index different from a refractive index of the base, the plurality of lattice elements being spaced apart on the base in a lattice shape at an interval equal to or less than a wavelength of target light;
providing a light confinement portion comprising a defect provided by a portion in which no lattice element is present at a lattice point of the photonic crystal body; and
providing an embedded structural body having a longitudinal direction which extends in a first direction along a Γ-K crystal orientation of a photonic crystal formed by the lattice elements, the embedded structural body being embedded in the base in the light confinement portion and having a refractive index less than the refractive index of the base;
wherein one of resonant modes of the resonator formed by the light confinement portion is in a state of having only one electric-field antinode in the embedded structural body;
wherein the embedded structural body has a refractive index greater than a refractive index of air;
wherein first lattice elements of the plurality of lattice elements adjacent to the light confinement portion in a second direction perpendicular to the first direction on a plane in which the plurality of lattice elements are arranged shift from first lattice points to separate from the light confinement portion in the second direction;
wherein second lattice elements of the plurality of lattice elements adjacent to the first lattice elements in the first direction shift from second lattice points to separate from the light confinement portion in the second direction;
wherein third lattice elements of the plurality of lattice elements adjacent to the first lattice elements and the second lattice elements on a side separating from the light confinement portion in the second direction shift from third lattice points to separate from the light confinement portion in the second direction;
wherein a shift amount of the first lattice elements is 0.05 to 0.5 times as large as a crystal period;

wherein a shift amount of the second lattice elements is 0.02 to 0.5 times as large as the crystal period; and wherein a shift amount of the third lattice elements is 0.01 to 0.5 times as large as the crystal period.

8. The method according to claim 7, wherein fourth lattice elements of the plurality of lattice elements adjacent to the light confinement portion in the first direction shift to separate from the light confinement portion in the first direction.

9. The method according to claim 7, wherein the first lattice elements, the second lattice elements, and the third lattice elements shift in the first direction.

10. The method according to claim 9, wherein the shift amounts are optimized according to a difference in refractive index between the base and each lattice element such that a Q value of the resonator is maximized.

11. The method according to claim 7, wherein the light confinement portion comprises a point defect in which one of the plurality of lattice elements of the photonic crystal is removed.

12. The method according to claim 7, wherein a length of the embedded structural body in the first direction is 0.65 to 1.25 times as large as the crystal period.

\* \* \* \* \*